United States Patent [19]

Kimura et al.

[11] 3,790,743
[45] Feb. 5, 1974

[54] WELDING ELECTRODE HAVING A NON-CONDUCTIVE TIP FOR SEMI-AUTOMATIC CONTINUOUS ARC WELDING MACHINE

[75] Inventors: Shinji Kimura, Fujisawa; Norihiro Fukui; Yasuhiro Nagai, both of Kamakura, all of Japan

[73] Assignee: Kobe Steel, Ltd., Kobe City, Hyogo-Prefecture, Japan

[22] Filed: Mar. 18, 1970

[21] Appl. No.: 20,491

[30] Foreign Application Priority Data
Mar. 31, 1969  Japan.................. 44-24548

[52] U.S. Cl.................. 219/130, 219/137, 219/146
[51] Int. Cl.............................................. B23k 9/00
[58] Field of Search... 219/130, 136, 137, 145, 146, 219/74; 117/201–207

[56] References Cited
UNITED STATES PATENTS

| | | | |
|---|---|---|---|
| 1,985,974 | 1/1935 | Cardoza | 117/202 X |
| 2,016,585 | 10/1935 | Basore et al. | 219/146 |
| 1,528,879 | 3/1925 | Holslag | 219/146 |
| 2,536,999 | 1/1951 | Skytte | 219/137 X |
| 2,694,023 | 11/1954 | Hopkins | 219/146 X |
| 3,303,322 | 2/1967 | Kimura et al. | 219/131 X |

FOREIGN PATENTS OR APPLICATIONS

| | | | |
|---|---|---|---|
| 623,383 | 5/1949 | Great Britain | 219/130 |
| 646,016 | 11/1950 | Great Britain | 219/130 |
| 655,940 | 8/1951 | Great Britain | 219/130 |
| 28,447 | 0/1965 | Japan | 219/137 |

*Primary Examiner*—J. V. Truhe
*Assistant Examiner*—George A. Montanye
*Attorney, Agent, or Firm*—Oblon, Fisher, Spivak, McClelland & Maier

[57] ABSTRACT

A coated welding electrode for use in a semi-automatic continuous arc welding apparatus is provided with a layer of predetermined thickness of a material which is electrically insulative at normal atmospheric temperature painted on the tip end thereof.

3 Claims, 3 Drawing Figures

INVENTORS
SHINJI KIMURA
NORIHIRO FUKUI
YASUHIRO NAGAI

BY *Oblon, Fisher & Spivak*

ATTORNEYS 3,790,743

WELDING ELECTRODE HAVING A NON-CONDUCTIVE TIP FOR SEMI-AUTOMATIC CONTINUOUS ARC WELDING MACHINE

BACKGROUND OF THE INVENTION

The present invention relates generally to continuous arc welding processes and machines therefor, and more particularly to a new and improved coated welding electrode for use in connection with machines of this character having apparatus associated therewith for semi-automatically feeding the welding electrodes by means of gravity or spring action, wherein the electrodes are connected to a single welding source of the machine and are disposed in a row so that a continuous bead may be obtained when an arc being generated along a welding line is transferred from one welding electrode to the next succeeding welding electrode in the row.

It is well known that various advantages are provided by semi-automatic continuous arc welding processes and machines of the character described, one of the more important being the increased welding efficiency achievable with inexpensive electrodes. However, with the conventional arc welding machines employing ordinary coated welding electrodes, it has been found that the welding material and welding conditions significantly affect the welding performance during transference of the arc from one welding electrode to a succeeding welding electrode. Thus, in order to obtain a continuous weld bead of good corrugation, the arc must be transferred in the direction of the welding line while the tip of the leading, or welding, electrode is in position to ride over the tip of the trailing, or next succeeding, electrode. The relationship between the leading electrode and the trailing electrode with respect to their relative disposition while the arc is being transferred, however, may vary according to the composition and the thickness of the coating material on the electrodes, the particular shape of the tip of each electrode, and the existing welding conditions. Accordingly, an undesirable result which often occurs is the transference of the arc as the leading electrode tip approaches the trailing electrode tip, but prior to the attainment of a suitable juxtapositional relationship for providing a smooth connection or a continuous and uninterrupted bead. Also, under certain welding conditions, complete solidification of the molten weld metal supplied by the leading electrode takes place before the molten weld metal supplied by the trailing electrode solidifies, in which case a recessed portion is formed on the path of transference of the arc, which in turn impairs the appearance of the resulting bead or otherwise requires the same to be rewelded.

SUMMARY OF THE INVENTION

Accordingly, it is an object of the present invention to provide a new and improved continuous arc welding apparatus which produces a smooth bead connection during arc transference between successively operating welding electrodes.

Another object of the present invention is to provide an improved continuous arc welding apparatus of the type employing successively operating welding electrodes which relies upon the movement of an operating, or leading, electrode into a predetermined juxtapositional relationship with a trailing electrode for effecting the transfer of the arc from the leading electrode to the trailing electrode.

Still another object of this invention is to provide an arc welding electrode having improved resistance to accidental or premature arc generation.

In accordance with the present invention, the foregoing and other objects are attained by applying a layer of suitable thickness of an agent substantially containing one or more of $SiO_2$, $Al_2O_3$ and $MgO$, in a proportion of 10 percent, and having electric insulating properties at normal atmospheric temperatures to the tip portions of ordinary coated arc welding electrodes. The aforedescribed defects which are inherent with the conventional semi-automatic continuous arc welding machines are eliminated by the semi-automatic continuous arc welding apparatus embodying the present invention, wherein the arc is transferred only upon sufficient movement of the tip of the leading electrode into juxtapositional relation with the tip of the trailing electrode such as will melt the agent thereon to form a slag of high viscosity covering the molten weld metal so as to give the resulting bead good corrugation and provide smooth succession of the consumed, or leading, electrode to the succeeding, or trailing, electrode during the arc transference therebetween.

BRIEF DESCRIPTION OF THE DRAWINGS

These and other objects, features and attendant advantages of the present invention will be more readily appreciated as the same becomes better understood by reference to the following detailed description when considered in connection with the accompanying drawings wherein like reference numerals designate like or corresponding parts throughout the several Figures and in which.

DESCRITPION OF A PREFERRED EMBODIMENT

Figure 1:
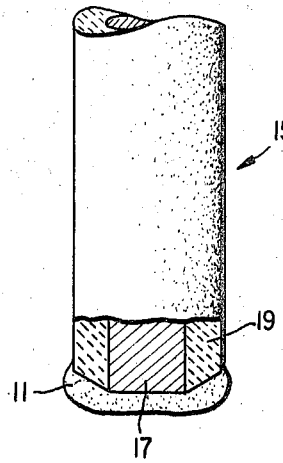
FIG. 1 is a longitudinal section of the agent-covered tip portion of a coated arc welding electrode embodying the present invention.

According to the present invention, particularly with reference to FIG. 1, a layer of suitable thickness of an agent, or material 11, is painted or otherwise secured to the tip portion of an arc welding electrode, generally indicated by the reference numeral 15, adjacent to the core wire 17 and a coating 19 of a suitable slag-forming material or the like which is extruded thereabout. The agent 11 consists of a material having an electric insulating property at normal atmospheric temperatures and containing one or more of the compounds in the group consisting of Silica ($SiO_2$), Alumina ($Al_2O_3$), and Magnesium Oxide (MgO) in a proportion of not less than 10percent relative to the total weight, and a cohesive agent.

Figures 2, 3:
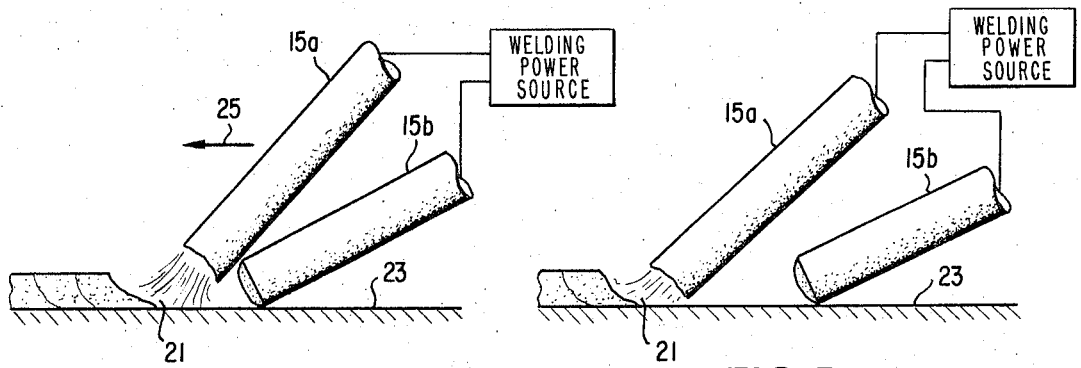
FIG. 2 is a side diagrammatic view showing the preferred location of the leading arc welding electrode relative to the trailing arc welding electrode while an arc is being transferred in a semi-automatic electrode feeding apparatus included in a continuous arc welding machine; and, FIG. 3 is another side diagrammatic view illustrating an accidental and premature arc generation by the trailing electrode which frequently occurs in conventional machines of this character, but is eliminated by the present invention.

In the semi-automatic continuous welding operation with the use of the electrodes of the present invention, it may be observed from FIG. 2 that when a leading, or operative, arc welding electrode 15a, which is shown forming a weld bead 21 over a workpiece 23 moving in the direction indicated by the arrow 25, is consumed to a point whereupon the tip portion thereof engages or becomes juxtapositioned with the tip of the trailing, or next succeeding, arc welding electrode 15b in the welding path, the elevated temperature of the arc heat will break the electric insulating property of the agent 11 painted on the tip of the following electrode 15b, thereby giving rise to a smooth succession of the consumed electrode 15a to the following electrode 15b. At this time, the agent 11 is melted into a slag for covering crators upon transference of the arc so that the solidification of the molten weld metal is delayed until it solidifies in contact with the molten slag. In this manner, a smooth connection can be obtained between one bead that is formed by one arc welding electrode and another bead being formed by a succeeding arc welding electrode.

In any case, the location of the leading electrode relative to the trailing electrode is maintained in such a manner as shown in FIG. 2 throughout the welding operation even though the arc transference takes place during said operation.

Referring now to FIG. 3, even if the loading electrode 15a is consumed a sufficient amount to displace its location relative to the trailing electrode 15b, the agent 11 provides an electric insulation between the tip of the trailing electrode and the workpiece 23 so that accidental, premature generation of arc is prevented.

The reason that the compounds contained in the agent 11 painted to the tip of the electrode 15, each of which also has electric insulating characteristics, is restricted as hereinabove described is because each of these compounds has a relatively higher value of viscosity which is sufficient, when they have been transformed into slag upon transference of the arc and admixed with another slag transformed from the coating material 19, to cause the slag to cover crators which might otherwise result.

In other words, each of the compounds such as, for example, $SiO_2$, $Al_2O_3$, and $MgO$, is electrically insulative at the normal atmospheric temperature and, for this reason, contributes to the arc transference only at a suitable position of welding. In addition thereto, it will be imparted with the viscosity of a relatively higher value at the elevated temperature that exists in the area of the welding arc, and will be melted so as to cause the molten weld metal to be uniformly solidified for eliminating defects, such as pits, undercuts and irregular shape of the resulting bead, all of which are inherent to the conventional welding process. These compounds may be employed singularly or in the form of a mixture containing one or more thereof, but must be added to the agent in a proportion being not less than 10 percent by weight.

Arc welding electrodes 15 painted with an agent 11 having added thereto any one of the following compounds were tested, and the results thereof in respect to the presence of such defects as hereinbefore mentioned are tabulated below:

| Compounds | Defects |
| --- | --- |
| Alumina | No |
| Silica | No |
| Mica | No |
| Magnesium oxide | No |
| Potassium oxide | Present |
| Calcium carbonate | Present |
| Barium carbonate | Present |
| Potassium perchlorate | Present |
| Painting Method: | The electrode tip was painted with a paste containing a suitable amount f water and 25 cc. of water glass for 100 g. of any one of the compounds specified, and then dried at the temperature of 100°C. for 30 minutes. |

From the above table, it will be clearly understood that any one of the compounds applied in the present invention gives the sufficient result. However, the same may be employed either in the form of a single compound or a mixture of two or more compounds, added to the agent in a proportion not less than 10 percent relative to the total weight thereof. Of course, among deoxidizing agents, Fe–Al or Fe–Si, for example, which will be transformed into $Al_2O_3$ or $SiO_2$ in the form of slag, may be added to the painting agent of the present invention in a sufficent proportion that it does not obstruct the electric insulating property of the same.

Though the present invention is applied with the compounds disclosed herein as the main component, it may be composed of a suitable fluxing material for use in a welding material normally containing metal oxide and deoxidizer. However, in this instance, organic compound and hydrous mineral are thermal-cracked to generate carbon dioxide gas and water vapor during the welding operation, resulting in the arc being unstable so that a connection of unfavorable shape may occur between beads formed by successive electrodes. For this reason, such compounds must be restricted in a relatively small proportion.

The present invention will be hereinafter fully illustrated by way of example.

EXAMPLE I

| | |
| --- | --- |
| Silica | 100 g. |
| Water glass | 20 c.c. |
| | (Specific gravity: 1.42) |

EXAMPLE II

| | |
| --- | --- |
| Silica sand | 60 g. |
| CaO | 40 g. |
| Silica soda | 20 c.c. |
| | (Specific gravity: 1.42) |

EXAMPLE III

| | |
| --- | --- |
| Silica sand | 50 g. |
| Magnesium oxide | 50 g. |
| Silica soda | 20 c.c. |
| | (Specific gravity: 1.42) |

EXAMPLE IV

| | |
| --- | --- |
| Alumina | 80 g. |
| Magnesium oxide | 20 g. |
| Silica soda | 20 c.c. |
| | (Specific gravity: 1.42) |

Each of the above painting agents as shown in Examples I to IV was painted to the tip of a coated electrode (as specified in JIS D4327) in the form of a layer of 0.5 mm. in thickness, and with the use of such an electrode the continuous arc welding was satisfactorily performed. As a result thereof, transference of the arc between one electrode to another took place smoothly and a bead having no connection was obtained.

As hereinbefore fully disclosed, the electrode of the present invention is characterized in the tip thereof being painted with an electrically insulative agent containing one or more of the specified compounds.

Obviously, many modifications and variations of the present invention are possible in the light of the above teachings. It is to be understood, therefore, that within the scope of the appended claims, the invention may be practiced otherwise than as specifically described.

What is claimed is:

1. In a semi-automatic continuous arc welding machine having a coated arc welding consumable electrode, the improvement comprising an electrically insulative coating completely covering the arcing end of said electrode, said covering consisting essentially of a nonconductive material selected from the group consisting of silica, alumina, mica, water glass, silica sand, silica soda, calcium oxide, magnesium oxide, and mixtures thereof.

2. The electrode set forth in claim 1 wherein said coating contains at least one of the compounds in the group consisting of $SiO_2$, $Al_2O_3$, and $MgO$, in a proportion of not less than 10 percent relative to the total weight thereof.

3. The electrode set forth in claim 1 wherein the thickness of said coating is approximately 0.5 mm.

* * * * *